Patented July 2, 1940

2,206,311

UNITED STATES PATENT OFFICE 2,206,311

METHOD OF MAKING LEVULINIC ACID

Alva Thompson, Chicago, Ill., assignor to Corn Products Refining Company, New York, N. Y., a corporation of New Jersey No Drawing. Application August 18, 1938, Serial No. 225,577

14 Claims. (Cl. 260—528)

This invention relates to the manufacture of levulinic acid, and more particularly to an improved method of manufacture whereby the levulinic acid may be produced more efficiently and more expeditiously.

Levulinic acid is ordinarily obtained by boiling hexoses, or other carbohydrates which may be converted into a hexose, with dilute mineral acid. For example, equal quantities of starch and hydrochloric acid (specific gravity 1.1) are mixed and heated twenty hours in a flask with a reflux condenser at 100° F.; the humus material is separated and pressed, the resulting liquid distilled under reduced pressure in a water bath; and the residue distilled from an oil bath under reduced pressure.

One of the objects of the present invention is to increase the speed of the reaction in the production of levulinic acid.

Another object is to increase the yield of levulinic acid.

A further object is to provide a more efficient starting material for the production process.

I have now found that the presence of sodium chloride in the reaction mixture from which levulinic acid is produced will not only increase the speed of the reaction between the acid and the carbohydrate but will also increase the yield of levulinic acid.

The reason for the improved results is not fully understood, but apparently the presence of the sodium chloride in the reaction mixture increases the activity of the mineral acid, thereby increasing its catalytic action.

Table I, showing the results of experiments with different quantities of salt being added to the reaction mixture, illustrates the increased yields obtained when sodium chloride is employed. I have found that hydrol (mother liquor from industrial, crystalline corn sugar which consists mostly of a mixture of carbohydrates, the greater parts of which are sugar) is particularly suitable as a starting product for my improved method for the reason that it already contains, as a result of the process employed in manufacturing crystalline corn sugar, approximately 4 to 5%, more or less, of sodium chloride, and, therefore, is superior to other carbohydrates for this purpose even though no additional sodium chloride is employed. Other hexoses or carbohydrate materials which may be converted into a hexose may, of course, be employed, but in the preferred embodiment of the present invention (and as a novel feature thereof) it is preferred to use hydrol, for the reason above stated, and for the further reason that hydrol is readily available at a comparatively low price.

The reaction mixture employed in the experiments, the results of which are tabulated in Table I, consisted of 200 grams carbohydrate (dry substance basis) added as 265 grams of final hydrol (containing about 4.5% sodium chloride), 400 cc. of water (including the water in the hydrol and in the acid), and 6% of hydrochloric acid (calculated as dry HCl on the basis of the water present). The solutions were heated at the boiling point for twenty-two hours; then filtered to remove humus material; the water, hydrochloric acid and formic acid distilled off; the salt filtered out; and the residue distilled under reduced pressure to isolate the levulinic acid. The figures set forth are in terms of grams.

Table I

| Amount of added salt (in grams) | Total salt content (in grams) | Yield of levulinic acid (in grams) |
|---|---|---|
| 0 | 12 | 36 |
| 20 | 32 | 40 |
| 40 | 52 | 46 |
| 60 | 72 | 48 |
| 80 | 92 | 46 |
| 100 | 112 | 43 |

As will be noted from the above table, the maximum yields, for the concentration employed in this particular series of experiments, are obtained when the total salt content is between 50 and 100 grams. Obviously, when the concentration of the entire mixture is increased or decreased, by varying the ratio of liquids to solids, the preferred salt content should be increased or decreased accordingly. On the basis of the above table and check tests run on varying concentrations, it has been found, as a general rule, the best results are obtained by the presence of salt in amounts such that the ratio of the percentage of salt to the percentage of water is from 1 to 4, to 1 to 8 or, in other words, a ratio of substantially 1 to 6. This, it will be understood is merely the preferential salt content for, as will be noted from Table I, improved yields may be obtained by the addition of less salt or more salt.

It has further been found that the yield of levulinic acid varies inversely with the concentration of carbohydrate in the reaction mixture. However, the cost of the process increases as the proportions of sugar to liquid used in the batch decreases. Therefore, in the preferred embodiment of this invention, the carbohydrate material is added slowly to the reaction mixture in order to reduce the concentration of the carbohydrate in the mixture at any given time and increase the yield of levulinic acid. In this manner the final concentration of levulinic acid will be gradually built up, resulting in a decreased cost of materials and handling.

Table II illustrates the effect of the concentration of carbohydrate in the reaction mixture upon the yield of levulinic acid. The reaction mixture in this series of runs contained 400 cc. of water (which included that added in the hydrol and the hydrochloric acid), 6% dry hydrochloric acid on the basis of the water, 80 grams of sodium chloride and varying quantities of carbohydrates added as final hydrol. The solutions were heated at the boiling point for twenty-two hours and the levulinic acid isolated, as above described.

Table II

| Carbo-hydrates (in grams) | Levulinic acid yield (in grams) | Percentage yield (dry carbohydrate basis) |
| --- | --- | --- |
| | | Per cent |
| 19 | 6.6 | 35 |
| 38 | 13.3 | 35 |
| 76 | 25.0 | 32 |
| 114 | 32.0 | 28 |
| 150 | 37.0 | 24.6 |
| 200 | 46.0 | 23 |
| 227 | 47.0 | 20.7 |

As will be noted from the above table, a lower concentration of carbohydrate in the reaction mixture results in a higher yield of levulinic acid.

The following example, which is purely typical and informative and not by way of limitation, illustrates a practical application of the above discovery by adding gradually instead of all at once the carbohydrate to the reaction mixture:

Into a mixture of 150 cc. of water, 80 grams of sodium chloride and 45 cc. of concentrated hydrochloric acid (specific gravity 1.18) refluxed in a flask was stirred 300 grams of final hydrol (227 grams dry substance basis) dissolved in 130 cc. of water, in 20 cc. portions at intervals of one-half hour over a period of eight hours. During the addition of the hydrol, 20 cc. more of concentrated hydrochloric acid was added. Heating at the boiling point was continued for a total of twenty-two hours. The levulinic acid was then isolated, as above described. The yield of levulinic acid was 57 grams or 25% on the basis of dry carbohydrate which, as will be noted from the foregoing Table II, is more than 4% higher than the yield obtained when all of the carbohydrate is mixed with the acid and salt simultaneously. In other words, the yield of levulinic acid from gradual addition of the carbohydrate is higher than the yield obtained when all of the carbohydrate is added at the start.

In carrying out the present invention, various modifications and variations may be employed without departing from the scope of the invention. Any hexose or other carbohydrate which may be converted into a hexose may be used as a starting material. Any suitable mineral acid, such as phosphoric, sulphuric or hydrochloric, may be employed, that is to say, any mineral acid which will not effect any substantial oxidizing or reducing action in the process. The quantity of salt in the reaction mixture may, as above indicated, be varied. If the carbohydrate is added to the reaction mixture gradually, it may be added in small increments from time to time, or it may be added in a slow, but continuously running stream and such incremental or gradual addition may be used to advantage with or without the use of sodium chloride. Heating may be effected at pressures above atmospheric pressure if desired. It will also be found that in carrying out the above described process one obtains satisfactory yields of humic acid as a by-product.

The term "hexose sugar" as used herein is used in a broad sense to include any carbohydrate which may be converted into a hexose sugar.

It is the intention to cover all variations and modifications within the scope of the appended claims.

I claim:

1. Method of making levulinic acid which comprises heating a mixture containing a hexose sugar, a dilute, substantially non-oxidizing and non-reducing mineral acid and sodium chloride.

2. Method of making levulinic acid which comprises boiling a mixture containing water, a dilute, substantially non-oxidizing and non-reducing mineral acid, and a hexose sugar solution containing sodium chloride.

3. Method of making levulinic acid which comprises boiling a mixture containing water, a dilute, substantially non-oxidizing and non-reducing mineral acid and mother liquor from dextrose crystallization.

4. Method of making levulinic acid which comprises adding salt to a mixture containing water, dilute, substantially non-oxidizing and non-reducing mineral acid and hydrol from crystalline dextrose, boiling the mixture, and then isolating the levulinic acid therefrom.

5. Method of making levulinic acid which comprises boiling a mixture comprising, in substantially the proportions stated, 400 parts water, 200 parts mother liquor from dextrose crystallization (dry substance basis), and 24 parts hydrochloric acid (dry substance basis), and then isolating the levulinic acid therefrom.

6. Method of making levulinic acid which comprises boiling a mixture comprising, in substantially the proportions stated, 400 parts water, 200 parts mother liquor from dextrose crystallization (dry substance basis), 24 parts hydrochloric acid (dry substance basis), and from 1 to 100 parts sodium chloride.

7. Method of making levulinic acid which comprises boiling a mixture comprising in substantially the proportions stated, 400 parts water, 200 parts mother liquor from dextrose crystallization (dry substance basis), 24 parts hydrochloric acid (dry substance basis), and 60 parts added sodium chloride.

8. Method of making levulinic acid which comprises boiling a mixture containing a hexose sugar, a dilute, substantially non-oxidizing and non-reducing mineral acid and sodium chloride, the ratio between the percentage of sodium chloride and the percentage of water being substantially one to six, and then extracting the levulinic acid therefrom.

9. Method of making levulinic acid which comprises boiling, for not substantially less than 22 hours, a mixture containing hydrol from crystalline dextrose, hydrochloric acid, and sodium chloride, the ratio between the percentage of sodium chloride and the percentage of water being substantially one to six and the hydrol comprising substantially the rest of the mixture, distilling off the water, the hydrochloric acid and the formic acid thus produced, filtering the same and then distilling the residue under reduced pressure to isolate the levulinic acid.

10. Method of making levulinic acid which comprises gradually adding a substance of the group consisting of hexoses and carbohydrate materials which may be converted into a hexose to a hot solution containing a substantially non-oxidizing and non-reducing mineral acid in the presence of sodium chloride.

11. Method of making levulinic acid which comprises slowly adding mother liquor from dextrose crystallization to a hot solution containing a substantially non-oxidizing and non-reducing mineral acid in the presence of sodium chloride.

12. Method of making levulinic acid which comprises slowly adding substantially 200 parts mother liquor from dextrose crystallization (dry substance basis), to a hot mixture of 400 parts water, and 24 parts hydrochloric acid, (dry substance basis); boiling the mixture for substantially a day; filtering the mixture; removing the hydrochloric acid, the salt and also the formic acid thus produced; and distilling the residue to isolate the levulinic acid.

13. Method of making levulinic acid which comprises slowly adding, in increments, substantially 200 parts mother liquor from dextrose crystallization (dry substance basis), to a hot mixture of 400 parts water, 60 parts sodium chloride, and 24 parts hydrochloric acid, (dry substance basis); boiling the mixture for substantially a day; filtering the mixture; removing the hydrochloric acid, the salt and also the formic acid thus produced; and distilling the residue to isolate the levulinic acid.

14. Method of making levulinic acid which comprises gradually adding to a hot solution of sodium chloride and hydrochloric acid, mother liquor from dextrose crystallization; stirring the solution and adding more hydrochloric acid as the hydrol is gradually added; boiling the mixture, and then isolating the levulinic acid therefrom.

ALVA THOMPSON.

CERTIFICATE OF CORRECTION.

Patent No. 2,206,311. July 2, 1940.

ALVA THOMPSON.

It is hereby certified that error appears in the printed specification of the above numbered patent requiring correction as follows: Page 3, first column, lines 16 and 17, claim 11, strike out the words "in the presence of sodium chloride"; and that the said Letters Patent should be read with this correction therein that the same may conform to the record of the case in the Patent Office.

Signed and sealed this 3rd day of September, A. D. 1940.

(Seal)

Henry Van Arsdale,
Acting Commissioner of Patents.